United States Patent
Sato et al.

[11] 3,729,641
[45] Apr. 24, 1973

[54] COOLING LIQUID ADMITTING AND EXHAUSTING DEVICE FOR USE WITH LIQUID-COOLED ELECTRICAL ROTARY MACHINES

[75] Inventors: Hiroshi Sato; Hisashi Toshima, both of Hitachi, Japan

[73] Assignee: Hitachi, Ltd., Tokyo, Japan

[22] Filed: June 15, 1971

[21] Appl. No.: 153,265

[30] Foreign Application Priority Data

June 19, 1970 Japan..........................45/52815

[52] U.S. Cl. ..................310/54, 310/61, 310/90
[51] Int. Cl. ..............................................H02k 9/00
[58] Field of Search......................310/52, 54, 53, 58, 310/59, 61, 62, 63, 64, 90

[56] References Cited

UNITED STATES PATENTS

| | | | |
|---|---|---|---|
| 3,571,634 | 3/1971 | Sato | 310/54 |
| 2,898,484 | 8/1959 | Krastchew | 310/54 |
| 3,359,438 | 12/1967 | Hylen | 310/64 |
| 3,457,440 | 7/1969 | Horsley | 310/52 |
| 3,543,062 | 11/1970 | Banchieri | 310/64 |
| 3,469,127 | 9/1969 | Eggemann | 310/54 |

*Primary Examiner*—R. Skudy
*Attorney*—Craig, Antonelli and Hill

[57] ABSTRACT

A device is provided for admitting the cooling liquid into the rotary member from the fixed member of a rotary machine or vice versa. A casing is disposed around a rotary shaft in such a manner that the cooling liquid admission and exhaust ports formed to open at the peripheral surface of the shaft may be enclosed in the casing, and sealing means are interposed between the shaft and casing to prevent the leakage of the cooling liquid and the mixture of the cooling liquid to be admitted and discharged. The casing is supported with bearing means disposed at the ends of the casing in such a manner that the casing may follow the fluctuation other than the rotation of the rotary shaft.

8 Claims, 4 Drawing Figures

Patented April 24, 1973 3,729,641

INVENTORS
HIROSHI SATO AND
HISASHI TOSHIMA

BY Craig, Antonelli & Hill
ATTORNEYS

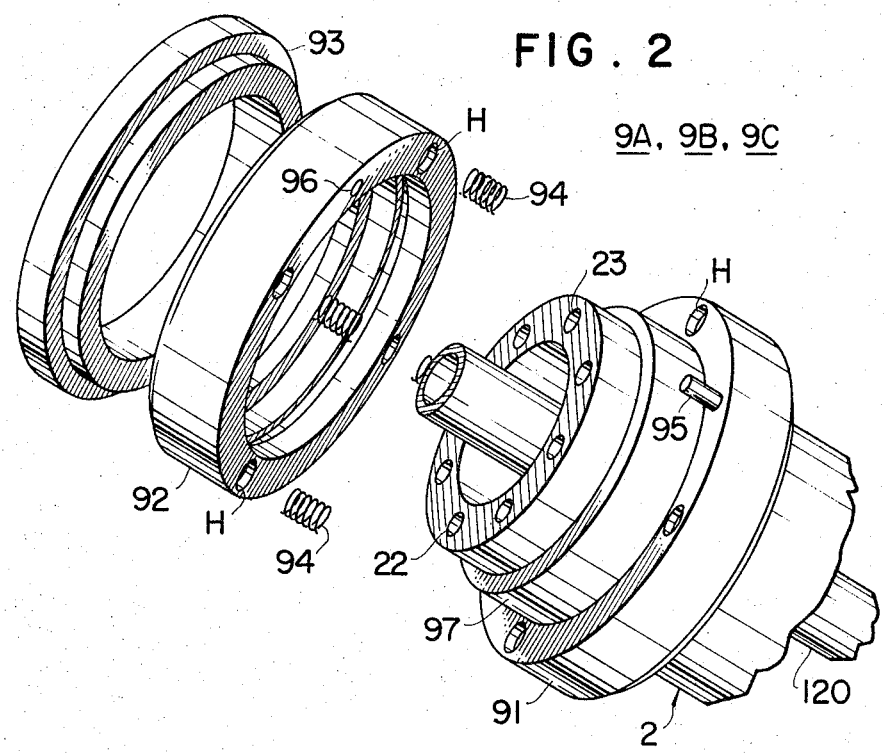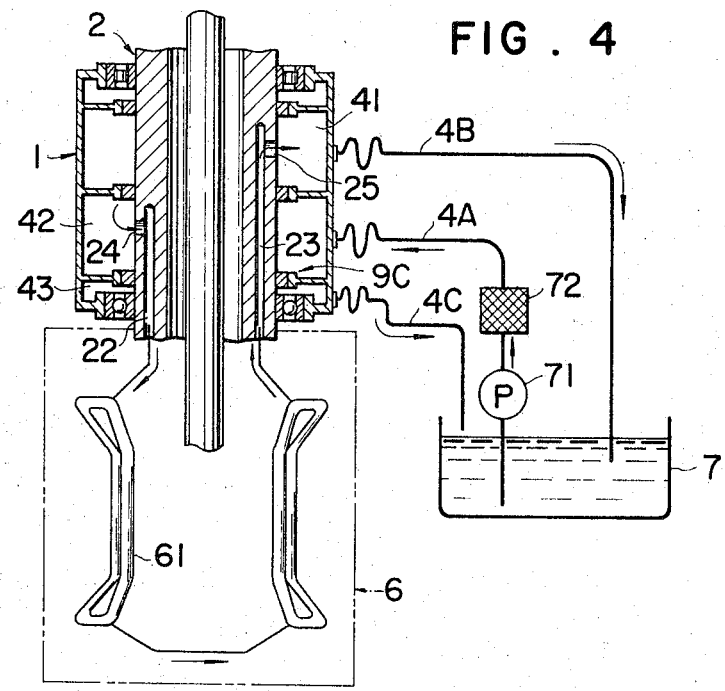

COOLING LIQUID ADMITTING AND EXHAUSTING DEVICE FOR USE WITH LIQUID-COOLED ELECTRICAL ROTARY MACHINES

BACKGROUND OF THE INVENTION

The present invention relates to generally a cooling liquid admitting and exhausting device for use in liquid-cooled electrical rotary machines in order to directly cool the various component parts of the rotors of the steam turbine or water turbine generators, and more particularly a improvement of a cooling liquid admitting and exhausting device for use in cooled-liquid electrical rotary machines for admitting and exhausting cooling liquid between the fixed and rotary members thereof.

Recently higher and higher capacity steam turbine and water turbine generators are manufactured, and it is essential to provide an efficient cooling system in order to attain the higher output. If this cooling problem is not taken into consideration, the generators will become large in size and complicated in mechanical construction, and require greater installation sites. Therefore, there have been proposed various cooling systems, but among them the most efficient cooling system is the direct cooling system with cooling liquid having a higher cooling capability. As the cooling liquid, water, oil and other suitable liquid may be employed, but water is most preferable because it is most inexpensive.

The cooling liquid cools not only the fixed members such as stators but also the rotary members such as rotors of the electrical rotary machines. The cooling circuits are formed to cool the conductors, cores, yokes and the like to cool them directly with water circulating through the circuits. It is relatively simple to admit and exhaust the cooling liquid into and out of the hydraulic circuits formed in the conductors and cores on the side of the stators of the rotary machines, and such cooling systems have been widely used in the turbine generators with the satisfactory effects. But the circulation of the cooling liquid in the circuits formed in the conductors, cores and yokes of the rotors has brought about some problems. One of them is the construction of the cooling liquid admitting and exhausting device which must be disposed between the fixed and rotary members of the electrical rotary machines. That is the cooling liquid must be admitted from the fixed or stationary member to the rotary member and exhausted from the rotary member to the stationary member so that the cooling liquid tends to leak from the connections between the fixed and rotary members. Especially when the rotary shafts of the rotary members displace axially and radially, the cooling liquid leaks in large quantity so that the feed of the cooling liquid to the rotary member is lowered, thus resulting in the insufficient cooling of the rotary member. One means to overcome this problem is to increase the quantity of cooling liquid to be supplied or admitted into the rotary member, but the leakage of cooling liquid will increase accordingly. Therefore, the efficient cooling cannot be attained. Since the construction of the cooling liquid admitting and exhausting device is very important as described above, the present invention contemplates the improvement thereof.

It is possible to admit and exhaust the cooling liquid at one end of the rotary shaft. In most cases, the axial cooling liquid admitting and exhausting ports or passages are formed in the rotary shafts in order to admit the cooling into the component parts to be cooled such as conductors of the rotors in the electrical rotary machines. The cooling liquid exhausting port or passage may be formed in a similar manner. The admitting and exhausting ports or passages are hydraulically communicated with the component parts to be cooled. Alternatively, an inner tube is inserted into the hollow rotary shaft coaxially thereof so as to define the cooling liquid admitting and exhausting passages, one being the inside of the inner tube and the other the annular space between the inner tube and the inner surface of the rotary shaft.

A casing is disposed around the rotary shaft so as to surround the free end of the rotary shaft and the cooling liquid admitting and exhausting ports, the casing defining two chambers with the admitting port opening into one of them while the exhausting port into the other. It is this casing that hydraulically communicates between the fixed and rotary members of the rotary machines.

In this case, there arises a very difficult problem of maintaining the liquid-tightness of the cooling liquid circulation circuits, especially at the point at which the fixed and rotary members make contact with each other, that is the portion at which the cooling liquid is admitted from he fixed member into the rotary member and exhausted from the rotary member to the fixed member. It is impossible to provide mechanical liquid-tight means between the fixed and rotary members in order to completely prevent the leakage of the cooling liquid therebetween.

Therefore in order that the liquid-tightness between the fixed and rotary members may be completely attained while permitting the free relative movement therebetween, the so-called mechanical or contact seals which are relatively in construction and reliable in operation have been widely used. In the mechanical seals, the fixed and rotary members are normally so maintained that they make sliding or rubbing contact with each other. In general, the mechanical or contact seals are such that the stepped portion or annular flange is formed around the rotary shaft and is pressed against the annular member formed on the fixed member for rubbing contact therebetween. However, the rotary shafts are not necessarily rotated at the fixed position. As for example, in case of the vertical shaft type water-turbine generators, the brackets which constitute the frame of the stator are displaced under the variation in hydraulic pressure exerting on the water-turbine so that the rotary shaft moves relative to the fixed member in the axial direction. Therefore the rubbing contact of the mechanical or contact seals is adversely affected so that the cooling liquid starts to leak. Furthermore because of the unbalance of the rotors and the inaccuracy in fabrication and assembly of the rotary shafts, the rubbing liquid-tight contact of the mechanical or contact seals is adversely affected. In some mechanical or contact seal constructions, one off the annular flange-like members of the fixed and rotary members which are made into rubbing contact with each other, is pressed against the other under the force of the springs. However because of the relative movement between the fixed and rotary members, the rubbing contact pressure is varied, that is the rubbing contact becomes unstable so that the cooling liquid starts to leak.

In addition, when the contact pressure between the annular flange-like members of the fixed and rotary members is varied, contact portions are unusually worm so that the cooling liquid may leak therethrough.

Therefore in case of the electrical rotary machines having the cooling liquid admitting and exhausting devices, it is preferable that the rotary shafts are supported in position with a higher degree of accuracy to prevent the displacement thereof and that the mechanical or contact seals which are highly reliable in operation though complicated in construction was employed. However, the cooling liquid admitting and exhausting devices become more complicated in construction and expensive, and require more labor and time.

There is one more important problem which must be taken into consideration. In case of the cooling liquid admitting and exhausting devices of the type described, they are disposed at one ends of the rotary shafts which are enclosed with the casings. When no additional or special device or the like is not fixed to this end, there will be no problem, but when the meausring instrument such as tachometer or the exciter is attached to one end of the rotary shaft, it becomes impossible to mount the cooling liquid admitting and exhausting device at this end of the rotary shaft, so that the cooling liquid is not admitted into the rotary member. Similarly when a machine or the like is installed within the hollow rotary shaft, it becomes impossible to directly cool the rotors. More particularly, in case of the generators driven by the Kaplan type water turbine, the oil pressure pipe or the operating rod is extended through the rotary shaft in order to adjust the runner blades and the device for controlling the oil pressure in the pipe or actuating the operation rod is disposed at the upper end of the rotary shaft, so that it is impossible to dispose the cooling liquid admitting and exhausting device of the type enclosing the upper end of the rotary shaft.

SUMMARY OF THE INVENTION

One of the objects of the present invention is therefore to provide an improved cooling liquid admitting and exhausting device for liquid-cooled electrical rotary machines in which there is provided means for preventing the leakage of cooling liquid from the connections between the hydraulic circuits in the fixed and rotary members.

Another object of the present invention is to provide an improved cooling liquid admitting and exhausting device for liquid cooled electrical rotary machines which is capable of preventing the leakage of cooling liquid from the connections between the hydraulic circuits in the fixed and rotary members even when there occurs some relative movement between them.

Another object of the present invention is to provide an improved cooling liquid admitting and exhausting device for use in liquid-cooled electrical rotary machines capable of circulating the cooling liquid between the fixed and rotary members even when a machine or the like is fixed to one end of the rotary shaft or is installed within the rotary shaft.

A still further object of the present invention is to provide an improved cooling liquid admitting and exhausting device for use in liquid-cooled electrical rotary machines which is simple to fabricate with less dimensional tolerance and to assemble.

The other objects, advantages and features of the present invention will become more apparent from the following description of the preferred embodiment thereof taken in conjunction with the accompanying drawing.

Briefly stated, the present invention provides an improved cooling liquid admitting and exhausting device for use in liquid-cooled electrical rotary machines characterized by a rotary member or rotary shaft having cooling liquid admitting and exhausting ports opened at the peripheral surface thereof, a casing disposed around said rotary shaft to enclose said cooling liquid admitting and exhausting ports, means for liquid-tightly sealing between said casing and said rotary shaft to prevent the leakage of cooling liquid and the mixture of the cooling liquid admitted and exhausted, and said casing being supported on said rotary shaft by bearing means.

BRIEF DESCRIPTION OF THE DRAWING

FIG. 2 is a perspective exploded view of means for preventing the leakage and mixture of cooling liquid in accordance with the present invention;

FIG. 4 is a schematic diagram illustrating the hydraulic circulation circuit of the cooling liquid of the device shown in FIG. 1.

DESCRIPTION OF THE PREFERRED EMBODIMENT

Figure 1:
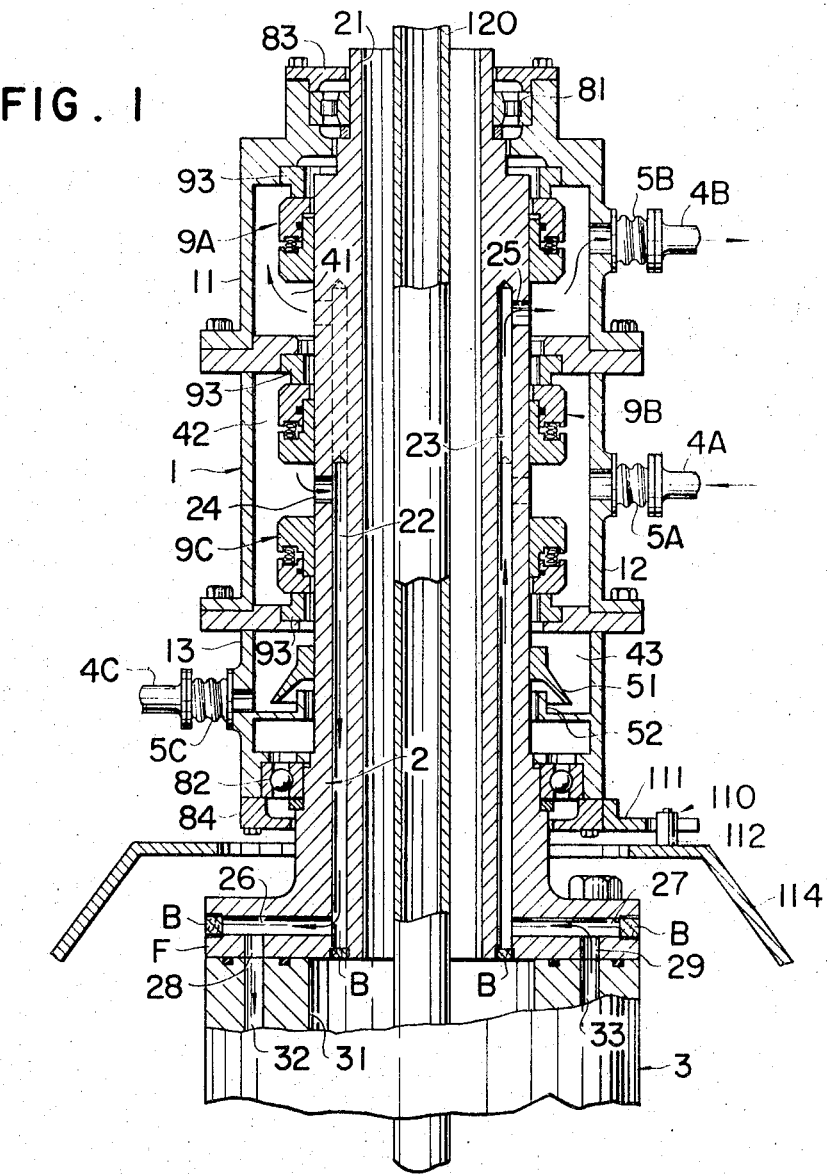
FIG. 1 is a longitudinal sectional view of a vertical shaft type electrical rotary machine especially illustrating the component parts around the rotary shaft, said machine being provided with the cooling liquid admitting and exhausting device in accord with the present invention.

FIG. 1 illustrates a large capacity rotary machine such as a vertical shaft type water turbine generator comprising a casing 1 of a cooling liquid admitting and exhausting device, a cooling liquid admitting and exhausting shaft 2, a main rotary shaft 3, cooling liquid admitting tubes 4A and cooling liquid exhausting tubes 4B. The portions through which the cooling liquid is admitted and exhausted are shown in section. The cooling liquid admitting and exhausting shaft 2 has a hole 21 formed coaxially, and an operation rod or hydraulic pressure pipe 120 for controling the angle of the runner blades of a Kaplan type water turbine coupled to the generator is inserted into this hole 21 and extended beyond the upper end of this shaft 2. However, the shaft 2 may be solid when the runner blades are fixed and a tachometer or the like is connected to the upper end of the shaft 2.

A plurality of cooling liquid passages having different lengths, that is the shorter and longer passages, are axially formed in the wall of the shaft 2, and the shorter passages generally indicated by 22 are used for admitting the cooling liquid while the longer passages 23 are used for exhausting the cooling liquid. The admitting and exhausting passages are determined respectively dependent upon the direction of the cooling liquid flow, so that when the direction is reversed the cooling liquid admitting and exhausting passages are of course reversed. The upper end of the admitting passage 22 does not reach the upper end of the shaft 2, but extends only one half of the length of the shaft 2 with the other or lower end opening at the connection end of the shaft 2. This opening is liquid-tightly sealed by a plug B. A port 24 which opens at the peripheral surface of the shaft 2 is formed through it to communicate with the lower portion of the admitting passage 22 so as to admit the cooling liquid through this port 24 into the liquid admitting passage 22.

The liquid exhausting passage 23 is longer than the liquid admitting passage 22, and is similar in construction to the admitting passage 22 except that an exhaust port 25 is formed through the shaft 2 at the upper portion of the passage 23. The lower end of the passage 23 opens at the connection end of the shaft 2 and is normally liquid-tightly closed by a plug B.

The connection end of the shaft 2 is flanged as shown at F, and is joined to the main rotary shaft 3 having an axial bore 31 by suitable fastening means such as bolts and nuts. The main rotary shaft 3 is also provided with a plurality of axial cooling liquid admitting and exhausting passages 32 and 33, but in general it is difficult to directly communicate these passages 32 and 33 in the main rotary shaft 3 to the passages 22 and 23 in the shaft 2. Therefore the radial communication passages 26 and 27 and the axial passages 28 and 29 are formed in the flange F. That is the cooling liquid admitting passage 22 is communicated with the passage 32 in the main rotary shaft 3 through the radial and axial passages 26 and 28 while the exhausting passage 23 in the shaft 2 is communicated with the passage 33 in the main rotary shaft 3 through the radial and axial passages 27 and 29. From the machining point of view, the radial passages 26 and 27 are opened at the side surface of the flange F so that the openings must be closed with the plugs B.

So far the main rotary shaft 3 and the fluid admitting and exhausting shaft 2 have been described as being separate component parts, but it will be understood that the cooling fluid admitting and exhausting shaft 2 may be an extension of the main rotary shaft 3. However, it is generally preferable that the shafts 2 and 3 are separate units to facilitate manufacture and transportation.

The cooling fluid admitting and exhausting passages 32 and 33 of the main rotary shaft 3 are in communication with the portions to be cooled or hollow conductor coils 61 of a rotor 6 (See FIG. 4) which must be cooled.

Thus the hydraulic circuit for circulating the cooling liquid in the rotary members is established. That is, the cooling liquid flows from the port or inlet 24 through the cooling liquid admitting passage 22, the communication passages 26 and 28, the admitting passage 32, the portions to be cooled of the rotor, the exhausting passage 33, the axial and radial communication passages 29 and 27, the exhausting passage 23 to the port or outlet 25. It should be noted that the admitting port 24 must be axially spaced apart from the exhausting port 25 so that they are not located on the same circumference of the shaft 2. The reason is that if the two ports 24 and 25 were located on the same circumference of the shaft 2, no cooling liquid would be admitted into or exhausted out of the shaft 2 when it is rotated.

The cooling liquid admitting and exhausting shaft 2 including the ports 24 and 25 which are arranged as described hereinabove is surrounded by the casing 1, which is preferably comprised of a plurality of sections in view of fabrication and assembly, which are joined together by bolting. In the instant embodiment, the casing 1 comprises an exhausting box 11, an admitting box 12 and a leaking liquid collection box 13. The casing 1 is mounted on the shaft 2 through a pair of vertically or axially spaced apart bearings 81 and 82 so that the casing 1 will not rotate in unison with the shaft 2. More particularly the bearings 81 and 82 are disposed at both ends of the casing 1 so as to permit the casing to follow the motion of the shaft 2 except its rotation and to support the casing 1 in a stable manner. If the casing 1 is supported by one bearing, it tends to make contact with or rub the shaft 2 so that the sliding contact members of the cooling liquid sealing means to be described in detail hereinafter is excessively abraised. As a consequence the cooling liquid would leak out. Furthermore, when the casing 1 is not supported by a pair of bearings, the casing 1 tends to vibrate or incline due to he pressure difference between the cooling liquid admitted and exhausted. More than two bearings would be not preferable in view of the installation space of the cooling liquid sealing means and of the locations of the admitting and exhaust ports 24 and 25. Furthermore a number of sealing means would have to be increased. Therefore the best compromise is the disposition of the bearings at both end of the casing 1 as shown in FIG. 1. In the instant embodiment, the ball-and-roller bearings are employed, but it is understood that any other suitable bearing such as plain bearings or combination of the ball-and-roller bearings with the plain bearings may be employed. The bearings 81 and 82 are sealed with bearing covers 83 and 84.

Three sealing means 9A, 9B and 9C are interposed between the casing 1 and the shaft 2. The first sealing means 9A is disposed in the cooling liquid exhausting box 11 of the casing 1 on the side closer to the upper bearing 81. The second sealing means 9B is interposed between the exhausting box 11 and the admitting box 12 of the casing 1 in such a manner that the exhaust port 25 may open between the first and second sealing means 9A and 9B. The third sealing means 9C is interposed between the admitting box 12 and the leaking liquid collection box 13 in such a manner that the admitting port 24 may open between them. Thus by these three sealing means 9A, 9B and 9C are defined an exhaust chamber 41 and an admitting chamber 42 between the casing 1 nd the shaft 2 and a leaking liquid collection chamber 43 is defined by the third sealing means 9C and the lower bearing 82.

These three sealing means 9A, 9B and 9C are similar in construction except that the lower or third sealing means 9C is reversed in direction in installation, and the detail of the sealing means is best shown in FIG. 2. The sealing means comprises spring support ring 91 which is carried by the shaft 2 for rotation in unison therewith, a seal ring 92 which rotates in unison with the support ring 91 and is capable of displacement axially, and a fixed ring 93 which contacts with the seal ring 92 but does not rotate therewith, and is securely fixed to the casing 1. More particularly, compression springs 94 are interposed between the spring support ring 91 and the seal ring 92 so that the seal ring 92, which is axially movable, is normally pressed against the fixed ring 93 so as to provide a liquid-tight sealing at the surface of contact between them. Both of the support ring 91 and sealing ring 92 are formed with blind holes H to securely retain the tension springs 94 in them. Holes 96 are drilled into the undersurface of the seal ring 92 to receive pins 95 axially extending from the support ring 91 so that the rotation of the support ring 91 may be transmitted to the seal ring 92 and that the axial movement of the seal ring 92 relative to the support ring 91 may be permitted. Furthermore, the reduced-diameter portion 97 may be formed in the support ring 91 so as to serve as the guide for the axial movement of the seal ring 92. Alternatively, the seal ring 92 may be so arranged as to slide directly on the shaft 2.

By these sealing means 9A, 9B and 9C the coding liquid exhausting chamber 41, the admitting chamber 42 and the leaking liquid collecting chamber 43 are liquid-tightly sealed from each other and the exterior of the casing 1 so that the leakage of the cooling liquid and the mixture of the cooling liquid to be admitted with that exhausted may be positively prevented.

The cooling liquid admitting box 12 is hydraulically connected with a feed pump 71 (See FIG. 4) through a cooling liquid admitting or feed pipe 4A while the exhausting box 11 is connected with a reservoir 7 (See also FIG. 4) through an exhausting or discharge pipe 4B. Flexible means 5A and 5B such as bellows or rubber hoses are used for connection of these pipes 4A and 4B to the boxes 12 and 11 because the casing 1 vibrates or displaces somewhat.

A flinger 51 is securely fixed to the shaft 2 in the leaking liquid collection chamber 43, and a leaking liquid reservoir 52 is defined within the leaking liquid collection box 13. A leaking liquid collection pipe 4C is connected to the lowermost portion of the leaking liquid collection reservoir 52, through the flexible means 5C of the type described above. It should be noted that all of the fixed components to be connected to the casing 1 must be connected through such flexible means.

Figure 3:
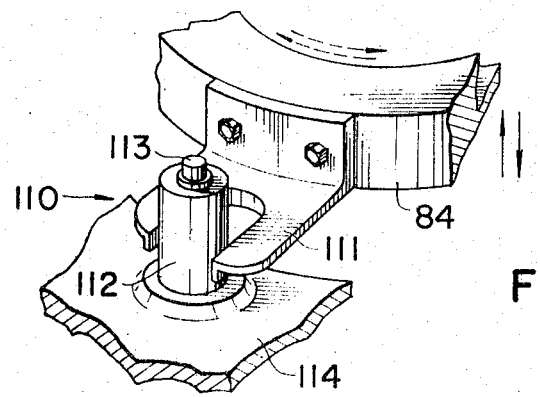
FIG. 3 is a fragmentary perspective view illustrating means for preventing the rotation of the casing and its associated component parts.

The rotation preventive means 110 is provided in order to prevent the rotation of the casing 1 in unison with the shaft 2 even though some axial displacement or vibrations of the casing 1 are permitted. A plurality of preventive means 110 are used, but they are all similar in construction so that the description of one preventive means will be made. As best shown in FIG. 3, the rotation preventive means 110 comprises a bifurcated member 111 securely fixed by welding or bolting to the bearing cover 84 which in turn is fixed to the leaking liquid collection box 13 and a stopper 112 which is securely fixed by a rod 113 to, for example, the stator frame 114 of the generator and is fitted into the slot of the bifurcated member 111 with some gap as shown in FIG. 3. The stopper 112 is made of an elastic material such as rubber in order to absorb the shock produced when the shaft 2 starts to rotate. Therefore, when the casing 1 tends to rotate in the direction indicated by the broken arrow in FIG. 3, one of the arms of the bifurcated member 111 immediately makes contact with the stopper 112 to prevent the further rotation of the casing 1. However, it is noted that the casing 1 may displace in the direction indicated by the solid arrow because of the gap between the arms of the bifurcated member 11 and the stopper 112.

In addition to the preventive means 110 described above with reference to FIG. 3, any other suitable conventional means may be employed, and for example the casing 1 may be supported by the springs or the keys may be used. However, the axial movement of the casing 1 must be permitted so that there must be provided some gap between the member on the side of the casing 1 and the member on the side of the shaft 2. Therefore, one of the member is preferably made of an elastic material such as rubber as described above in order to absorb the shock in case of rotation.

Next the mode of operation of the cooling liquid admitting and exhausting device with the arrangement described above will be described with particular reference to FIG. 4. The cooling fluid flows in the direction indicated by the solid arrows in the rotor 6 and the cooling liquid admitting and exhausting shaft 2 which is joined to the rotor 6 for rotation. More particularly the cooling liquid in the reservoir 7 is forced into the admitting chamber 41 through a filter 72 by the pump 71 and then into the cooling liquid admitting passage 22 through the port 24 of the shaft 2 to flow through the hollow conductor winding 61 to remove the heat from it, and is finally returned to the shaft 2 again. That is, the cooling liquid is discharged through the passage 23, the port 25, the exhausting chamber 41 and the exhausting or discharge pipe 4B into the reservoir 7.

The cooling liquid leaking from the exhausting chamber 41 is collected in the leading liquid collection chamber 43 and is returned to he reservoir 7 through the pipe 4C. If the cooling liquid should leaks through the first or upper sealing means 9A (See FIG. 1) toward the upper bearing 81, a similar leaking liquid collection means may be provided.

Thus, the rotor 6 is sufficiently cooled, but since the casing 1 or the fixed member contact with the shaft 2 or the rotating member, the very difficult problem of attaining the air-tightness between them rises. The main rotary shaft 3 moves in all directions because of the thermal expansion in the axial direction and the vibrations due to the variation in load. Therefore unless the sealing means 9A, 9B and 9C follow these displacement and vibrations of the main rotary shaft 3, the failure of air- or liquid-tight sealing and abnormal abrasion will occur so that the reliable operation becomes impossible. However these problems are completely solved by the arrangement of the present invention described hereinabove. More particularly, referring to FIG. 1, when the shaft 2 is displaced due to the displacement and vibrations of the main rotary shaft 3, the casing 1 may smoothly follow the shaft 2 because the casing 1 is carried by the pair of bearings 81 and 82 and the exterior fixed members such as the cooling liquid admitting and exhausting pipes 4A and 4B, the rotation preventive means 110 and the like are coupled to the casing 1 in a flexible manner as described above. As a consequence no excessive force will be exerted on the sealing means 9A, 9B and 9C. That is, these sealing means may be maintained always under the same conditions so that the sufficient liquid-tightness may be attained. Furthermore the bearings 81 and 82 are disposed at both ends of the casing 1 as described hereinabove, which are the most stable positions for supporting the casing 1 with the minimum vibrations of the casing 1. Thus the casing 1 may smoothly follow the movement of the shaft 2 so that the leakage of the cooling liquid from the shaft 2 may be completely prevented.

Even when the operating rod or oil pressure pipe 120 extends through the hollow shaft 2 and the main rotary shaft 3 or the tachometer or the like id disposed at the upper end of the shaft 2, they will not present any problem because the admission and exhaust of the cooling liquid are effected through the passage formed within the wall of the shaft 2. Furthermore, one of the important features of the present invention resides inn the fact that the cooling liquid admitting and exhausting device of the type described above may be formed around the main rotary shaft of the generator when a sufficient installation space is available even when it is impossible to dispose the cooling liquid admitting and exhausting shaft 2 together with the casing 1 immediately upon the upper end of the main rotary shaft because of the limited space or limited height of the generator or in view of the design thereof. In this case, the desired component parts may be cooled by the cooling liquid directly supplied from the main rotary shaft.

As described hereinabove, the casing is mounted through the pair of bearing means around the cooling liquid admitting and exhausting shaft or rotary shaft so as to enclose the intake and exhaust ports formed in the shaft, the bearings being disposed at both ends of the casing. Therefore, the cooling liquid sealing means interposed between the casing and the shaft may follow the motions of the casing as well as the shaft. That is there is no relative motion between the shaft and the casing so that no excess force will exert on the sealing means, whereby the sealing means may contact with the shaft always under a constant pressure. As a consequence very reliable sealing effect may be attained to completely prevent the leakage of the cooling liquid. Furthermore the abnormal abrasion of the component parts of the sealing means may be effectively prevented so that the reliability may be improved. Since the sealing means may follow the movement of the shaft together with the casing, some errors in assembly may be allowed. This means that is is not necessary to machine the component parts of the sealing means with a higher degree of accuracy, that cumbersome manual works, fitting works and the like may be eliminated and that the assembly may be much facilitated.

The cooling liquid admitting and exhausting device of the present invention is disposed so as to surround the rotary shaft, and the cooling liquid admitting and exhausting ports are formed in the peripheral surface of the shaft so that the cooling liquid may be fed to the rotor of the rotary machine in which a device or mechanism is fixed to one end of the rotary shaft thereof or is disposed within the shaft. Furthermore, the cooling liquid admitting and exhausting device of the present invention may be installed at any suitable portion of the rotary shaft so that the design, fabrication and assembly may be simplified.

In the instant embodiment, the cooling liquid admitting and exhausting device has been described as being mounted on the vertical shaft type generator, but it will be understood that the device gay be also mounted on the horizontal shaft type machines. In this case, the leaking liquid collection chamber 43 must be somewhat modified so that no cooling liquid will leak even when the rotary shaft is horizontal.

So far the cooling liquid admitting and exhausting passages have been described as being formed in the walls of the hollow cooling liquid admitting and exhausting shaft 2 and the hollow rotary shaft 3, but it will be understood that an inner tube may be inserted into the hollow shaft when a device is fixed to one end of the rotary shaft, so that the interior of this inner tube and the space defined between the tube and the rotary shaft may be used as the cooling liquid admitting and exhausting passages respectively. Furthermore, the admitting and exhausting passages are formed in the axial direction of the solid rotary shaft.

From the foregoing description it is seen that the cooling liquid admitting and exhausting device of the present invention may be applied to both of the vertical and horizontal rotary machines and may completely prevent the leakage of the cooling liquid. For example even when the rotary shaft moves in he axial direction or vibrates, the cooling liquid may be prevented from leaking. The device may be fabricated and assembled in a simple manner by less skilled workmen. In addition, the device is simple in construction, and satisfactorily functions to admit and exhaust the cooling liquid even when another device is fixed to one end of the rotary shaft or installed therein.

While the special embodiment of the invention has been illustrated and described as an example, it will be of course understood that the present invention is not limited to this embodiment but includes other similar embodiments and variations.

What is claimed is:

1. A cooling liquid admitting and exhausting device for use with liquid-cooled electric rotary machines characterized by a rotor having a plurality of hollow fluid conductor coils; a rotary shaft coupled to said rotor and having a plurality of cooling liquid admitting and exhausting passages formed therein in communication with said hollow fluid conductor coils, inlets and outlets for cooling liquid formed in said plurality of cooling liquid admitting and exhausting passages being opened at the peripheral surface of said rotary shaft intermediate the ends thereof; a casing disposed around said rotary shaft so as to surround said inlets and outlets and to define between said casing and said rotary shaft at least two chambers, said inlets opening into one of said two chambers and said outlets opening into the other; sealing means for liquid-tightly partitioning said two chambers to prevent the leakage of the cooling liquid; and bearing means for mounting said casing around said rotary shaft, said bearing means comprising a pair of bearings disposed at respective ends of said casing.

2. A cooling liquid admitting and exhausting device for use in liquid-cooled electrical rotary machines as specified in claim 1 wherein all of the fixed members to be coupled to said casing are coupled to said casing through flexible means.

3. A cooling liquid admitting and exhausting device for use in liquid-cooled electrical rotary machines as specified in claim 1 wherein said casing is coupled to a fixed member through a plurality of rotation preventive means each of which comprises a rod-shaped stopper and a bifurcated member into the slot of which is disposed said rod-shaped stopper, whereby said casing may be permitted to move axially but may not be permitted to rotate.

4. A cooling liquid admitting and exhausting device for use in liquid-cooled electrical rotary machines as specified in claim 1 wherein said rotary shaft is hollow, and another machine is disposed in the hollow portion of said rotary shaft.

5. A cooling liquid admitting and exhausting device for use in liquid-cooled electrical rotary machines as specified in claim 1 wherein another machine is disposed at one end of said rotary shaft.

6. A cooling liquid admitting and exhausting device for use in liquid-cooled electrical rotary machines as specified in claim 1 wherein said cooling liquid inlets and outlets opening at the peripheral surface of said rotary shaft are axially spaced apart from each other by a predetermined distance.

7. A cooling liquid admitting and exhausting device for use in liquid-cooled electrical rotary machines as specified in claim 1 wherein said casing comprises at least two sections.

8. A cooling liquid admitting and exhausting device for use in liquid-cooled electrical rotary machines characterized by a rotor having a plurality of hollow conductor coils, a main rotary shaft which carries said rotor and has a plurality of cooling liquid admitting and exhausting passages formed therein and hydraulically communicated with said hollow conductor coils, a cooling liquid admitting and exhausting shaft which is coupled to said main rotary shaft coaxially at one end thereof and has a plurality of cooling liquid admitting and exhausting passages formed therein and hydraulically communicated with those in said main rotary shaft, the cooling liquid admitting and exhausting ports of said plurality of cooling liquid admitting and exhausting passages in said second mentioned shaft being opened at the peripheral surface intermediate the ends thereof, a casing disposed around said second mentioned shaft so as to surround or enclose said inlet and outlets ports, bearing means for mounting said casing upon said second mentioned shaft at both ends of said casing, means for preventing the rotation of said casing, and sealing means for liquid-tightly partitioning a cooling liquid exhausting chamber having a cooling liquid discharge pipe, a cooling liquid admitting box having a cooling liquid admitting pipe and a leaking liquid collection box having a leaking liquid discharge pipe from one another, said three liquid boxes being defined by said casing.

* * * * *